United States Patent
La et al.

(10) Patent No.: US 10,401,559 B2
(45) Date of Patent: Sep. 3, 2019

(54) LIGHT GUIDE PLATE POSITION FIXING FRAME AND DISPLAY DEVICE HAVING THE SAME

(71) Applicant: SAMSUNG DISPLAY CO., LTD., Yongin-si, Gyeonggi-do (KR)

(72) Inventors: Sojeong La, Hwaseong-si (KR); Myoungseok Son, Yongin-si (KR); Sehee Jeon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/005,829

(22) Filed: Jun. 12, 2018

(65) Prior Publication Data

US 2018/0356586 A1    Dec. 13, 2018

(30) Foreign Application Priority Data

Jun. 13, 2017  (KR) .................. 10-2017-0073930

(51) Int. Cl.

| | | |
|---|---|---|
| *F21V 8/00* | (2006.01) | |
| *G02F 1/1335* | (2006.01) | |
| *G02F 1/1345* | (2006.01) | |

(52) U.S. Cl.
CPC ....... *G02B 6/0088* (2013.01); *G02F 1/13452* (2013.01); *G02F 1/133514* (2013.01); *G02F 1/133524* (2013.01); *G02F 1/133603* (2013.01); *G02F 1/133608* (2013.01); *G02F 2201/121* (2013.01); *G02F 2201/123* (2013.01)

(58) Field of Classification Search
CPC ............ G02B 6/0088; G02F 1/133514; G02F 1/133524; G02F 1/133603; G02F 1/133608; G02F 1/13452; G02F 2201/121; G02F 2201/123

See application file for complete search history.

(56) References Cited

U.S. PATENT DOCUMENTS

| | | | |
|---|---|---|---|
| 9,110,214 B2* | 8/2015 | Lee ...................... | G09F 13/22 |
| 2013/0128547 A1* | 5/2013 | Kuo .................. | G02F 1/133608 |
| | | | 362/97.1 |
| 2016/0131829 A1* | 5/2016 | Shin ..................... | G02B 6/0088 |
| | | | 362/634 |

FOREIGN PATENT DOCUMENTS

| | | |
|---|---|---|
| JP | 11-249113 A | 9/1999 |
| KR | 10-0442504 B1 | 7/2004 |
| KR | 1020140010833 A | 1/2014 |

* cited by examiner

*Primary Examiner* — Mary Ellen Bowman
(74) *Attorney, Agent, or Firm* — Cantor Colburn LLP (57) ABSTRACT

A display device includes: a display panel; a lower frame including a bottom portion and side portions; a light source unit extending along a first side portion of the lower frame; a light guide plate including a light opposing surface opposing a light incident surface in a first direction; a first auxiliary frame in the lower frame to restrict movement of the light incident surface in the first direction; a second auxiliary frame fixable to the bottom portion of the lower frame to restrict movement of the light opposing surface in the first direction; and a coupling member with which the second auxiliary frame is fixed to the lower frame. The second auxiliary frame includes a through hole through which the coupling member is extendable, and a width of a head portion of the coupling member is larger than a width of the through hole.

20 Claims, 8 Drawing Sheets

LIGHT GUIDE PLATE POSITION FIXING FRAME AND DISPLAY DEVICE HAVING THE SAME

This application claims priority to Korean Patent Application No. 10-2017-0073930, filed on Jun. 13, 2017, in the Korean Intellectual Property Office, and all the benefits accruing therefrom under 35 U.S.C. § 119, the content of which in its entirety is herein incorporated by reference.

BACKGROUND

1. Field

Embodiments of the invention relate to a display device, and more particularly, to a display device capable of improving optical characteristic deviations.

2. Description of the Related Art

Display devices may be classified into a self-emission type display device that displays an image by self-emitting light and a light-receiving type display device that displays an image by controlling a light emitted by a separate light source. A representative one of the light-receiving type display devices may be a liquid crystal display ("LCD") device.

LCD devices are one of widely used flat panel display ("FPD") devices, which include two substrates on which field generating electrodes such as a pixel electrode and a common electrode are disposed, a liquid crystal layer between the two substrates, and a backlight unit for providing a light to the liquid crystal layer. Upon applying voltage to the field generating electrodes to generate an electric field over the liquid crystal layer, the orientation of liquid crystal molecules in the liquid crystal layer are determined, thereby controlling an amount of light emitted from the backlight unit to display an image. The backlight unit includes a light source which emits light, a light guide plate which converts the light emitted from the light source into a surface light source by dispersing the light, various diffusion films, and the like.

In such an example, depending on the distance between the light source and the light guide plate, the characteristics of the light emitted from the display device may vary, resulting in optical characteristic deviations and deterioration of display quality.

SUMMARY

Embodiments of the invention may be directed to a display device capable of improving an assembly tolerance of a light source and a light guide plate and reducing optical characteristic deviations irrespective of variations in manufacturing of the light guide plate.

According to an exemplary embodiment, a display device includes: a display panel which displays an image with light provided thereto; a lower frame including a bottom portion facing the display panel and side portions each extending from the bottom portion; a light source unit which generates and emits the light, disposed on the bottom portion of the lower frame to extend along a first side portion thereof; a light guide plate through which the light is guided from the light source toward the display panel, the light guide plate including a light incident surface to which the light emitted from the light source unit is incident and a light opposing surface opposing the light incident surface in a first direction; a first auxiliary frame disposed in the lower frame, between the light incident surface of the light guide plate and the first side portion of the lower frame to restrict movement of the light incident surface in the first direction; a second auxiliary frame fixable to the bottom portion of the lower frame to restrict movement of the light opposing surface in the first direction; and a coupling member with which the second auxiliary frame is fixed to the lower frame. The second auxiliary frame includes a through hole defined therein through which the coupling member is extendable to the lower frame, and a width of a head portion of the coupling member is larger than a width of the through hole through which the coupling member is extendable.

The coupling member may further include a screw portion.

The screw portion may be threaded.

The lower frame may have a threaded groove with which the screw portion of the coupling member is engagable.

The first auxiliary frame may include: a first support portion extended along the first side portion of the lower frame and in contact with the light incident surface of the light guide plate; and a second support portion extended along and in contact with a second side portion of the lower frame which is extended from the first support portion in the first direction.

The first auxiliary frame may have an L-like shape.

The second auxiliary frame may include: a light guide plate aligning portion extended along the light opposing surface of the light guide plate and in contact with the light opposing surface of the light guide plate; and a position adjusting portion extended from the light guide plate aligning portion along the first direction, the position adjusting portion fixable to the bottom portion of the lower frame to adjust a position of the second auxiliary frame relative to the lower frame.

The second auxiliary frame may have an L-like shape.

According to an exemplary embodiment, a display device includes: a display panel which displays an image with light provided thereto; a lower frame including a bottom portion facing the display panel and side portions each extending from the bottom portion; a light source unit which generates and emits the light, disposed on the bottom portion of the lower frame to extend along a first side portion thereof; a light guide plate through which the light is guided from the light source toward the display panel, the light guide plate including a light incident surface to which the light emitted from the light source unit is incident and a light opposing surface opposing the light incident surface in a first direction; a first auxiliary frame disposed in the lower frame, between the light incident surface of the light guide plate and the first side portion of the lower frame to restrict movement of the light incident surface in the first direction; and a second auxiliary frame fixable to the bottom portion of the lower frame to restrict movement of the light opposing surface in the first direction. The lower frame includes a coupling member protruding from the bottom portion, the second auxiliary frame includes a through hole defined therein through which the coupling member is extendable, the through hole defined by an insertion portion and a fastening portion, a width of the insertion portion of the through hole is different from a width of the fastening portion of the through hole, and a width of an upper surface of the coupling member of the lower frame is larger than the width of the fastening portion of the through hole.

A protruded portion of the bottom portion of the lower frame may define the coupling member thereof.

The coupling member may have a dovetail-shaped cross-section.

The width of the insertion portion of the through hole may be larger than the width of the fastening portion of the through hole.

The first auxiliary frame may include: a first support portion extended along the first side portion of the lower frame and in contact with the light incident surface of the light guide plate; and a second support portion extended along and in contact with a second side portion of the lower frame which is extended from the first support portion in the first direction.

The first auxiliary frame may have an L-like shape.

The second auxiliary frame may include: a light guide plate aligning portion extended along the light opposing surface of the light guide plate and in contact with the light opposing surface of the light guide plate; and a position adjusting portion extended from the light guide plate aligning portion along the first direction, the position adjusting portion fixable to the bottom portion of the lower frame to adjust a position of the second auxiliary frame relative to the lower frame.

The second auxiliary frame may have an L-like shape.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being "on" another layer, area, or plate, it may be directly on the other layer, area, or plate, or intervening layers, areas, or plates may be present therebetween. Conversely, when a layer, area, or plate is referred to as being related to another element such as being "directly on" another layer, area, or plate, intervening layers, areas, or plates may be absent therebetween. Further when a layer, area, or plate is referred to as being related to another element such as being "below" another layer, area, or plate, it may be directly below the other layer, area, or plate, or intervening layers, areas, or plates may be present therebetween. Conversely, when a layer, area, or plate is referred to as being related to another element such as being "directly below" another layer, area, or plate, intervening layers, areas, or plates may be absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "mechanically connected" or "physically connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within ±30%, 20%, 10% or 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the invention and like reference numerals refer to like elements throughout the specification.

Hereinafter, an exemplary embodiment of a display device according to the invention will be described in detail with reference to FIGS. 1, 2A and 2B.

Figure 1:
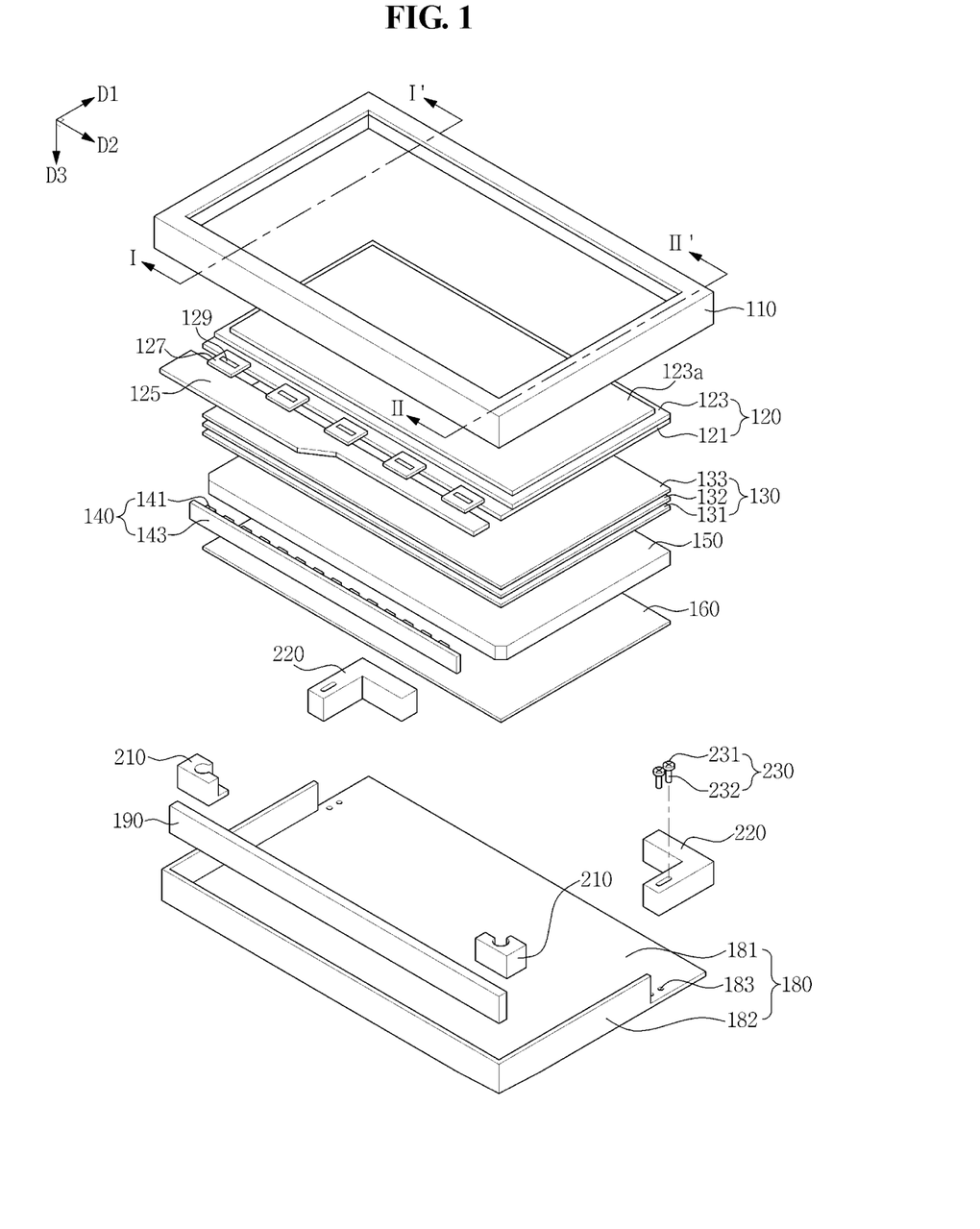
FIG. 1 is an exploded perspective view schematically illustrating an exemplary embodiment of a display device according to the invention.
Figure 2A:
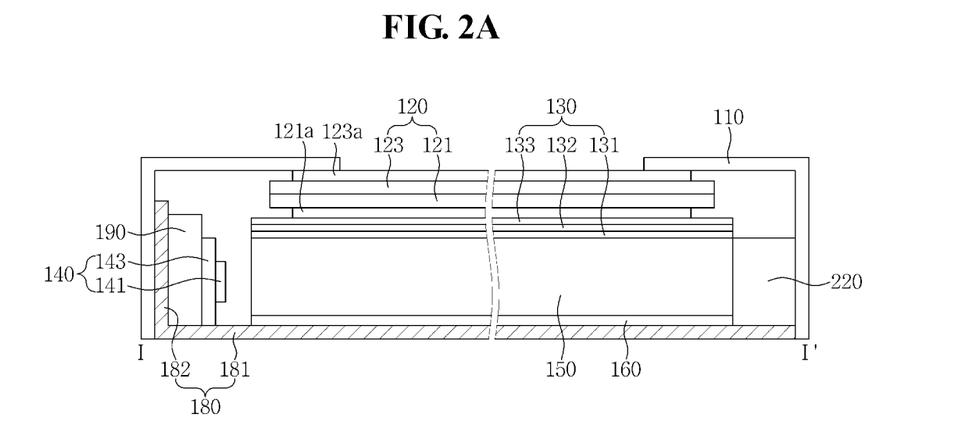
FIG. 2A is a cross-sectional view taken along line I-I' of FIG. 1.

FIG. 1 is an exploded perspective view schematically illustrating an exemplary embodiment of a display device according to the invention, and FIG. 2A is a cross-sectional view taken along line I-I' of FIG. 1.

Display devices may be classified into a self-emission type display device that displays an image by self-emitting light and a light-receiving type display device that displays an image by controlling a light emitted by a separate light source. Hereinafter, the display devices according to exemplary embodiments are assumed to be an LCD device, but exemplary embodiments are not limited thereto.

Figure 2B:
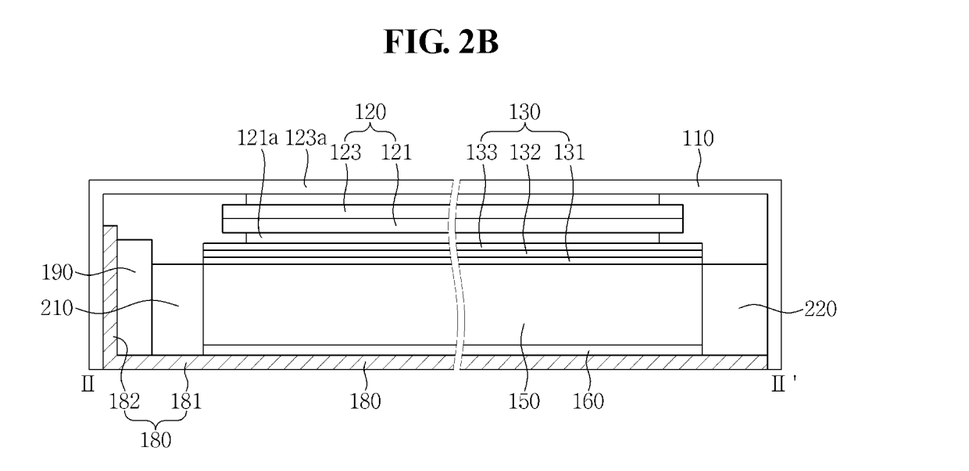
FIG. 2B is a cross-sectional view taken along line II-II' of FIG. 2.

Referring to FIGS. 1 and 2, an exemplary embodiment of the display device according to the invention includes an upper frame 110 through which a displayed image is viewed at a viewing side of the display device, a display panel 120, an optical sheet (member) 130, a light source unit 140, a light guide plate 150, a reflection sheet 160, an extrusion bar 190, a lower frame 180, a first auxiliary frame (member) 210 and a second auxiliary frame (member) 220.

Hereinafter, the optical sheet 130, the light source unit 140, the light guide plate 150, the reflection sheet 160, the extrusion bar 190, the lower frame 180, the first auxiliary frame 210 and the second auxiliary frame 220 are collectively referred to as a backlight unit.

The upper frame 110 has an opening window for exposing an active area of the display panel 120 to the outside and is disposed so as to cover a front edge and a side surface of the display panel 120. An image may be displayed at the active area of the display panel 120 and the image may not be displayed at the front edge thereof. The upper frame 110 may include a relatively rigid metal material such as stainless steel or a material having good heat dissipation properties such as aluminum or an aluminum alloy.

The display panel 120 may be provided in a quadrangular plate shape and receive an electric signal from outside thereof to generate and display an image. The display panel 120 may include a first (display) substrate 121, a second (display) substrate 123 opposing the first substrate 121, an optical control layer such as a liquid crystal layer (not illustrated) between the first substrate 121 and the second substrate 123, or the like.

The first substrate 121 includes a pixel electrode which may be arranged in a matrix, a thin film transistor applying a driving voltage to the pixel electrode and various (conductive) signal lines for driving the pixel electrode and the thin film transistor to control light transmitted through the optical control layer for generating the image.

The second substrate 123 is disposed to oppose the first substrate 121, and includes a common electrode including a transparent conductive material and a color filter. However, exemplary embodiments are not limited thereto, and the common electrode and the color filter may be disposed in the first substrate 121. The color filter may include red, green and blue color filters.

The optical control layer such as the liquid crystal layer (not illustrated) is interposed between the first substrate 121 and the second substrate 123. An arrangement of particles of the optical control layer such as liquid crystal molecules of the liquid crystal layer is rearranged by an electric field formed between the pixel electrode and the common electrode. As such, the rearranged liquid crystal layer adjusts a transmittance of a light emitted from the backlight unit and provided to the display panel, and the adjusted light passes through the color filter to display an image to the outside.

In addition, a lower polarizer 121a may be further disposed on a rear surface of the first substrate 121 and an upper polarizer 123a may be further disposed on an upper surface of the second substrate 123. The upper polarizer 123a and the lower polarizer 121a may have a planar area corresponding to a planar area of the display panel 120.

The upper polarizer 123a may transmit only a specific polarized light among the light incident thereto arriving from outside the display device, and absorb or block the remaining outside light. The lower polarizer plate 121a may transmit only a specific polarized light among the light incident thereto emitted from the backlight unit, and absorb or block the remaining incident light.

A driving circuit board 125 may be disposed on a side of the display panel 120. The driving circuit board 125 may generate and/or apply various control signals and a power signal for driving the display panel 120 to at least generate and display the image.

The display panel 120 and the driving circuit board 125 may be electrically connected to each other by a flexible printed circuit board ("FPCB") 127. The FPCB 127 may be a chip on film ("COF") or a tape carrier package ("TCP"). The FPCB 127 may be provided in plurality relative to a single one of the driving circuit board 125. The number of the FPCBs 127 may vary depending on the size and driving scheme of the display panel 120.

A driving chip 129 may be mounted on the FPCB 127. The driving chip 129 may generate various driving signals for driving the display panel 120 to at least generate and display the image. The driving chip 129 may be implemented as a driver integrated circuit ("IC") or a source IC in which a timing controller and a data driving circuit are integrated into a single chip.

The optical sheet 130 is disposed above the light guide plate 150 to diffuse and collimate the light transmitted from the light guide plate 150 toward the display panel 120. The optical sheet 130 may include a collection of individual sheets or members such as a diffusion sheet 131, a prism sheet 132, a passivation sheet 133, and the like.

The diffusion sheet 131 may serve to diffuse the guided light emitted from the light guide plate 150 so as to substantially prevent the light from being partially concentrated.

The prism sheet 132 may include, at a surface thereof, prisms each having a shape of a triangular column in a predetermined arrangement. The prism sheet 132 may be disposed on the diffusion sheet 131 and serve to collimate the light diffused by the diffusion sheet 131 in a direction perpendicular to the display panel 120.

The passivation sheet 133 may be disposed on the prism sheet 132 and serve to protect a surface of the prism sheet 132 and diffuse the light to achieve uniform light distribution.

Although not illustrated, the display device according to an exemplary embodiment may include an intermediate frame. In an exemplary embodiment, for example, the intermediate frame may have a polygonal frame shape in which an empty space is defined. In addition, the intermediate frame may be disposed or formed into a single shape having a single continuous member, or may be disposed or formed as a plurality of separate frame portions as required, and then assembled to form the intermediate frame. The intermediate frame may include a flexible material such as plastic, or may be formed through an injection molding process or the like.

The light source unit 140 may be disposed at an edge portion of the light guide plate 150 among plural edge portions thereof. The light source unit 140 may be disposed at a side surface of the light guide plate 150 in consideration of the size of the display panel 120, luminance uniformity, and the like, to define a light incident side surface of the light guide plate 150 among side surfaces thereof.

According to an exemplary embodiment, the light source unit 140 is accommodated in the lower frame 180, to be described below. A length of the light source unit 140 extends parallel with a length of a side (wall) portion 182 of the lower frame 180. In an exemplary embodiment, for example, the light source unit 140 is disposed between one side surface of the light guide plate 150 and the side portion 182 of the lower frame 180.

According to an exemplary embodiment, the light source unit 140 may be disposed at a predetermined distance from a light incident surface 150a of the light guide plate 150, to be described below, which will be described below in detail with reference to FIGS. 3, 4, 5A and 5B.

The light source unit 140 includes a light source 141 and a light source substrate 143 at which the light source 141 is disposed. The light source 141 may be disposed at an edge or one side surface of the light guide plate 150. That is, the light source 141 may generate and emit a light toward the edge or one side surface of the light guide plate 150. The light source 141 may include at least one light emitting diode ("LED") chip (not illustrated) and a package (not illustrated) for accommodating the LED chip. In an exemplary embodiment, for example, the LED chip (not illustrated) may be a gallium nitride (GaN)-based LED chip emitting a blue light.

The light source 141 may be provided in plurality, such as arranged along a length of the light source substrate 143 and/or the light source unit 140. The number of the light sources 141 may vary in consideration of the size of the display panel 120, luminance uniformity, or the like. The light source substrate 143 may be a printed circuit board ("PCB") or a metal printed circuit board ("metal PCB").

Although not illustrated, a wavelength conversion unit (not illustrated) may be disposed between the light source unit 140 and the light guide plate 150. The wavelength conversion unit (not illustrated) may include a material which may convert a wavelength of light incident thereto. In an exemplary embodiment, for example, the wavelength conversion unit may convert a wavelength of a blue light emitted from a blue LED light source into a white light.

As a plate, the light guide plate 150 may have a relatively large cross-sectional thickness. Although described as a plate for convenience of explanation, the light guide plate 150 may be in the form of a sheet or a film for which the cross-sectional thickness is smaller than that of the plate and is relatively small as compared to the planar size thereof, to slim down the display device. That is, the light guide plate 150 may be understood as including a plate or a film for guiding light.

The light guide plate 150 may include a light transmitting material so that light can be efficiently guided at an inner area thereof. In an exemplary embodiment, for example, the light guide plate 150 may include a glass. In an exemplary embodiment, for example, the light guide plate 150 may include a glass having a relatively small expansion coefficient with respect to external humidity and/or temperature changes. In an exemplary embodiment, for example, the light guide plate 150 may include a soda lime glass, a borosilicate glass and/or a quartz glass.

A pattern may be disposed or formed at a surface of the light guide plate 150. In an exemplary embodiment, for example, a scattering pattern (not illustrated) may be formed so that the light guided toward a rear surface may be emitted upwards.

The light guide plate 150 may include a light emission surface facing the display panel 120 and from which light is emitted to outside the light guide plate 150, and the rear surface opposite to the light guide plate 150 and facing the reflection sheet 160. Side surfaces of the light guide plate connect the light emission surface and the rear surface to each other. One side surface of the light guide plate 150 facing the light source unit 140 is to be referred to as the light incident surface 150a and one side surface of the light guide plate 150 opposing the light incident surface 150a is to be referred to as a light opposing surface 150b. That is, one surface of the light guide plate 150 that receives the light emitted from the light source unit 140 is referred to as the light incident surface 150a and one surface of the light guide plate 150 that opposes the light incident surface 150a is referred to as the light opposing surface 150b. Two remaining side surfaces of the light guide plate 150 connecting the light incident surface 150a and the light opposing surface 150b are referred to as side surfaces 150c and 150d.

For convenience of explanation, in a top plan view, a direction perpendicular to a length of the light incident surface 150a is to be defined as a first direction D1, and a direction parallel to the length of the light incident surface 150a is to be defined as a second direction D2. In addition, a thickness direction of the light guide plate 150 is to be defined as a third direction D3. The display device and components thereof are disposed in a plane defined by the first and second directions D1 and D2 crossing each other, while a thickness of the display device and components thereof is defined in the third direction D3 crossing each of the first and second directions D1 and D1.

The reflection sheet 160 may include, for example, polyethylene terephthalate ("PET") and be reflective, and a surface of the reflection sheet 160 may be coated with a diffusion layer including, for example, titanium dioxide. In addition, the reflection sheet 160 may include a material including a metal such as silver (Ag).

The extrusion bar 190 may be disposed between the light source unit 140 and the lower frame 180. In an exemplary embodiment, for example, in the case where the length of the light source unit 140 is disposed in parallel to a side surface of the light guide plate 150, a length of the extrusion bar 190 may be disposed parallel to the side surface of the light guide plate 150, such as to be disposed in the form of an elongated bar or a linear bar.

The extrusion bar 190 may include a relatively rigid metal material having good heat dissipation characteristics. In an exemplary embodiment, for example, the extrusion bar 190 may include at least one material selected from the group consisting of stainless steel, aluminum, aluminum alloys, magnesium, magnesium alloys, copper, copper alloys, and electrogalvanized steel sheets. The extrusion bar 190 may serve to dissipate heat generated in the light source unit 140 and the wavelength conversion unit (not illustrated) to outside thereof and/or outside the display device.

However, exemplary embodiments are not limited thereto, and the extrusion bar 190 may be omitted.

The first auxiliary frame 210 and the second auxiliary frame 220 will be described below in detail with reference to FIGS. 3, 4, 5A and 5B.

The lower frame 180 serves to maintain an overall framework of the display device and protect various components accommodated therein. The lower frame 180 may accommodate therein the light source unit 140, the light guide plate 150, the reflection sheet 160, the first auxiliary frame 210, the second auxiliary frame 220, and the like.

According to an exemplary embodiment, the lower frame 180 includes a bottom portion 181 and the side (wall) portion 182 each extending from the bottom portion 181 such as perpendicularly thereto. The side portion 182 may extend an entire length of a side of the bottom portion 181, such as at the side where the light source unit 140 is disposed, without being limited thereto. For a side of the bottom portion 181 at which the light source unit 140 is not disposed, the side portion 182 may be completely excluded (e.g., at sides thereof corresponding to the light opposing surface 150*b* of the light guide plate 150) or may be partially excluded (e.g., at sides thereof corresponding to the side surfaces 150*c* and 150*d* of the light guide plate 150). At the sides of the bottom portion 181 corresponding to the side surfaces 150*b*, 150*c* and 150*d* of the light guide plate 150, an edge of the bottom portion 181 may be exposed from the side portions 182.

In the case where the extrusion bar 190 is omitted from between the light source unit 140 and the lower frame 180, the side portion 182 of the lower frame 180 may contact the light source unit 140 and/or the first auxiliary frame 210.

The lower frame 180 may include a relatively rigid metal material having good heat dissipation characteristics. In an exemplary embodiment, for example, the lower frame 180 may include at least one member selected from the group consisting of stainless steel, aluminum, aluminum alloys, magnesium, magnesium alloys, copper, copper alloys, and electrogalvanized steel sheets.

Hereinafter, the first auxiliary frame 210, the second auxiliary frame 220 and a coupling member according to an exemplary embodiment will be described in detail with reference to FIGS. 3, 4, 5A, 5B, 6A and 6B.

Figure 3:
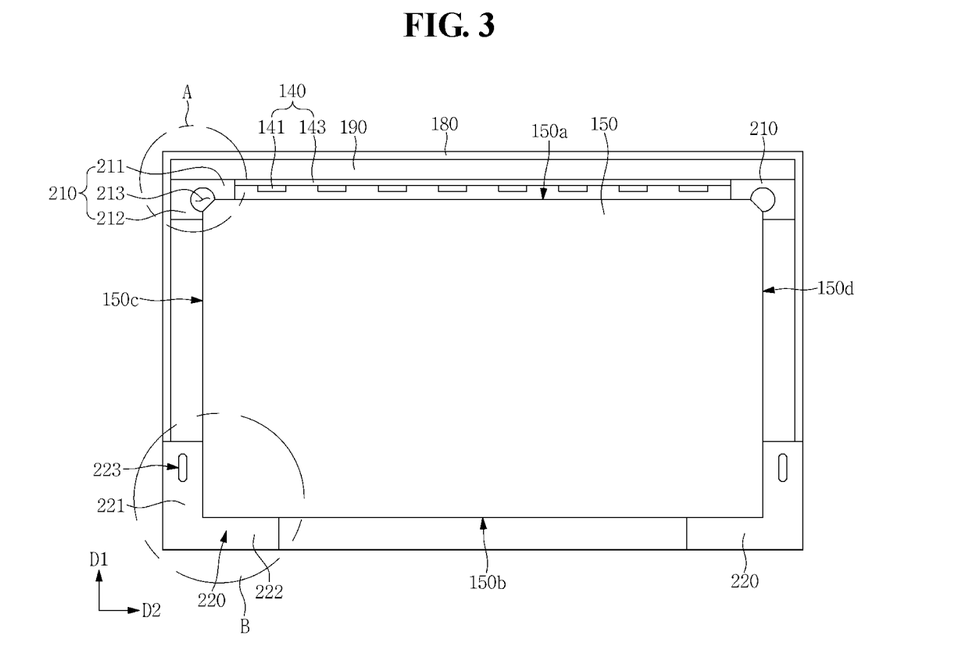
FIG. 3 is a top plan view illustrating an exemplary embodiment of a backlight unit according to the invention.
Figure 4:
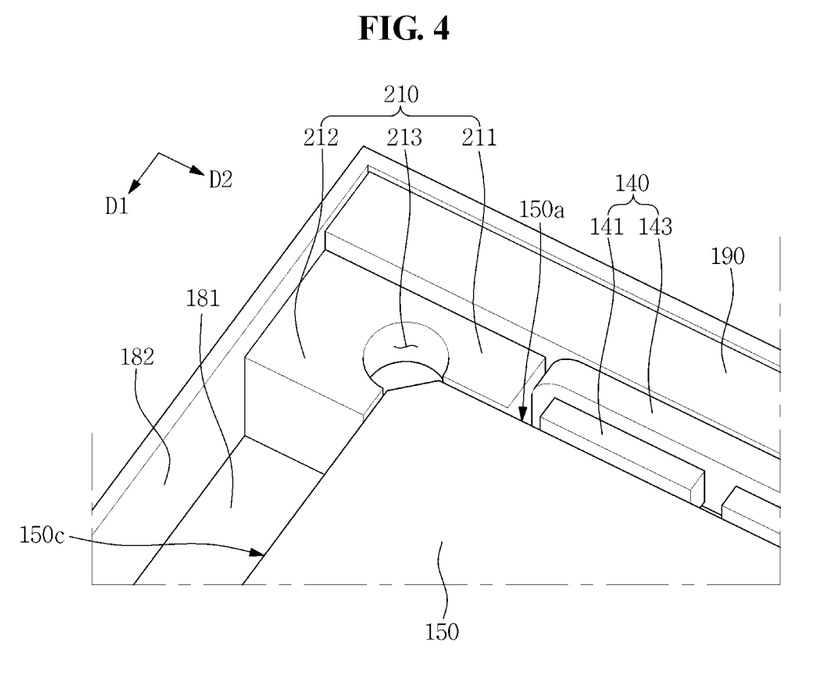
FIG. 4 is a perspective view schematically illustrating an exemplary embodiment of portion A of FIG. 3.
Figure 5A:
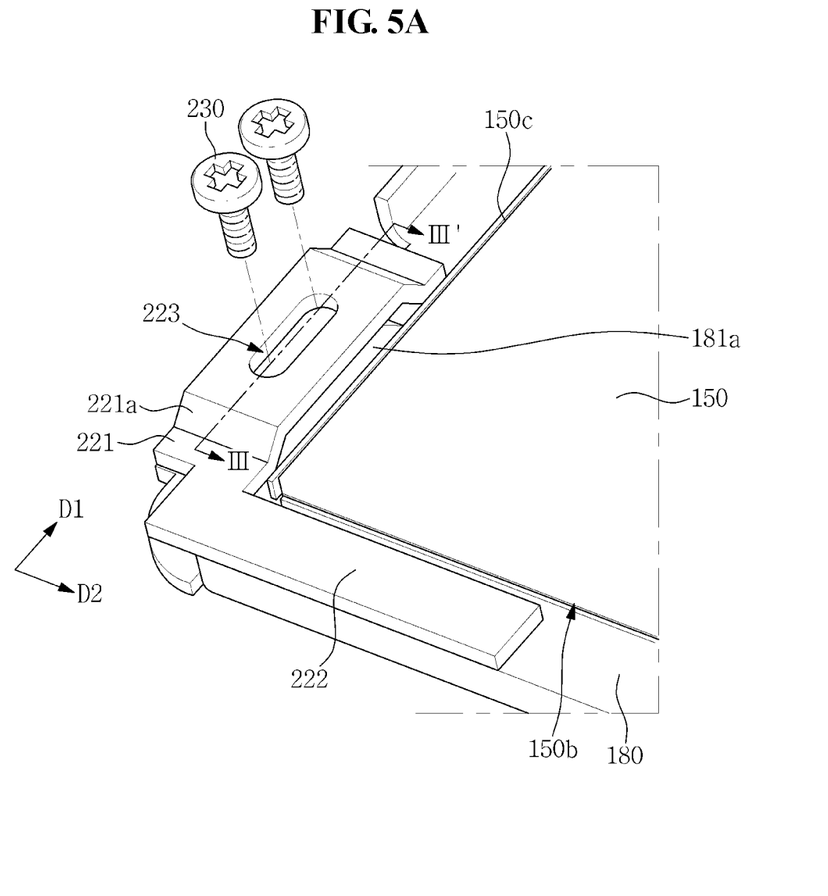
FIG. 5A is a perspective view schematically illustrating an exemplary embodiment of portion B of FIG. 3.
Figure 5B:
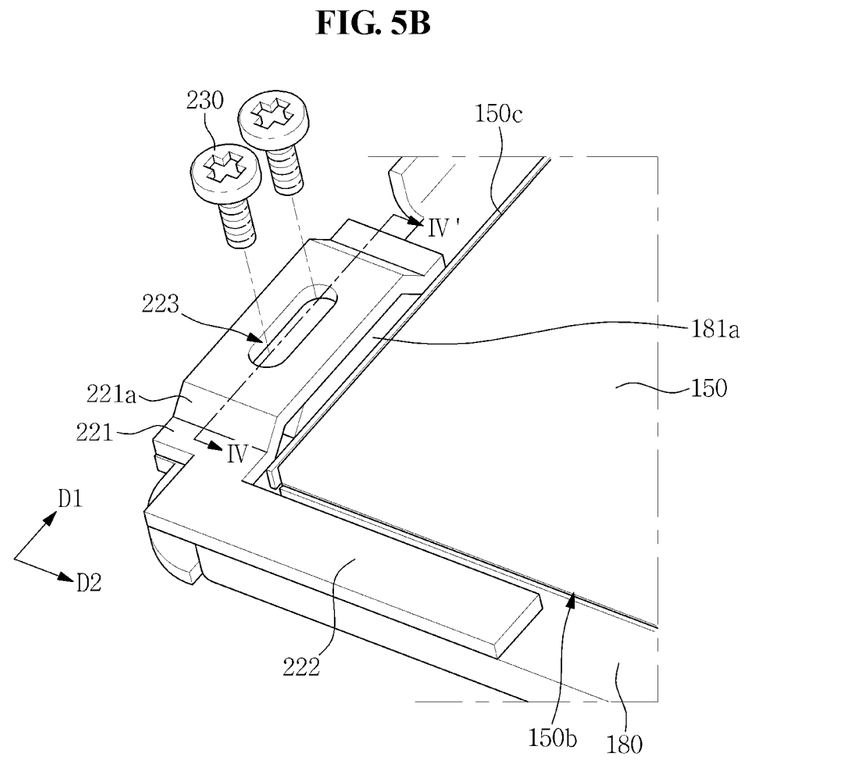
FIG. 5B is a perspective view schematically illustrating a modification of portion B of FIG. 3.

FIG. 3 is a top plan view illustrating an exemplary embodiment of a backlight unit according to the invention, FIG. 4 is a perspective view schematically illustrating an exemplary embodiment of portion A of FIG. 3, FIG. 5A is a perspective view schematically illustrating an exemplary embodiment of portion B of FIG. 3, and FIG. 5B is a perspective view schematically illustrating another exemplary embodiment of portion B of FIG. 3.

Referring to FIGS. 3 and 4, the first auxiliary frame 210 includes a first support portion 211 facing the light source unit 140 and the light incident surface 150*a* of the light guide plate 150, and a second support portion 212 bent from the first support portion 211 at a side surface of the light guide plate 150 to extend toward the second auxiliary frame 220. The first support portion 211 may contact the light source unit 140 and the light incident surface 150*a*.

The first auxiliary frame 210 is accommodated in the lower frame 180. In an exemplary embodiment, for example, the first support portion 211 and the second support portion 212 of the first auxiliary frame 180 are disposed on the bottom portion 181 of the lower frame 180 such as to extend in the plane defined by the first and second directions D1 and D2. In such an exemplary embodiment, a distal end surface of the first support portion 211 contacts the light incident surface 150*a* of the light guide plate 150. A distal end portion of the second support portion 212 contacts a respective side surface among the two side surfaces 150*c* and 150*d* of the light guide plate 150 and a of side portion 182 of the lower frame 180 among side portions 182 thereof. That is, the first auxiliary frame 210 maintains a position of the side surfaces 150*c* and 150*d* of the light guide plate 150, and the light incident surface 150*a* of the light guide plate 150, within the lower frame 180.

The plurality of first auxiliary frames 210 may be accommodated in the lower frame 180. In an exemplary embodiment, for example, as illustrated in FIG. 3, two first auxiliary frames 210 may be respectively disposed at opposing corners or side surfaces of the light guide plate 150 to oppose each other, having the light source unit 140 interposed therebetween along the second direction D2.

In an exemplary embodiment, for example, two first support portions 211 may be disposed to oppose each other along the second direction D2, having the light source unit 140 interposed therebetween, and two second support portions 212 may be respectively disposed at opposing side surfaces of the light guide plate 150 to oppose each other. Accordingly, the two first support portions 211 may substantially prevent the light guide plate 150 from moving along the first direction D1 to fix a position of the light incident surface 150*a* of the light guide plate 150 relative to the light source unit 140, and the two second support portions 212 may substantially prevent the light guide plate 150 from moving along the second direction D2 to fix positions of the side surfaces 150*c* and 150*d* of the light guide plate 150 relative to the light source unit 140. In the case where a location of the light incident surface 150*a* of the light guide plate 150 is fastened by the first support unit 211, a distance between the light source unit 140 and the light guide plate 150 may be maintained substantially constant, such that the optical characteristic deviations of the display device may be improved. In addition, the distance between the light source unit 140 and the light guide plate 150 may be adjusted according to a thickness in the direction D1 of the first support portion 211 within the plane defined by the first and second directions D1 and D2.

In addition, the first auxiliary frame 210 may have a protection groove 213 at a side surface of the first auxiliary frame 210 which faces the light guide plate 150 and at which a virtual length of the first support portion 211 crosses a virtual length the second support portion 212. The protection groove 213 is recessed from outer edges of the first auxiliary frame 210 in a direction away from the light guide plate 150 and is open in a direction toward the light guide plate 150. The protection groove 213 may substantially prevent misalignment due to a manufacturing tolerance of the light guide plate 150 having side surfaces thereof virtually extended to define a right-angled shape.

Referring to FIGS. 3, 5A and 5B, the second auxiliary frame 220 includes a position adjusting portion 221 and a light guide plate aligning portion 222. The light guide plate aligning portion 222 is extended from the position adjusting portion 221 so as to be movable therewith.

The position adjusting portion 221 has a through hole 223 with which a position of the second auxiliary frame 210 is adjusted. The position adjusting portion 221 is fastened to the lower frame 180 by a coupling member 230 which passes through the through hole 223 and is engaged with a thread groove 183 of the lower frame 180. In an exemplary embodiment, for example, as illustrated in FIGS. 5A and 5B, the through hole 223 has a width in the second direction D2 less than a width in the second direction D2 of a head portion 231 of the coupling member 230 to be described below and larger than a width of a screw (body) portion 232 of the coupling member 230. Accordingly, the screw portion 232 of the coupling member 230 may be inserted into the thread groove 183 of the lower frame 180 to be engaged therewith.

Figure 6A:
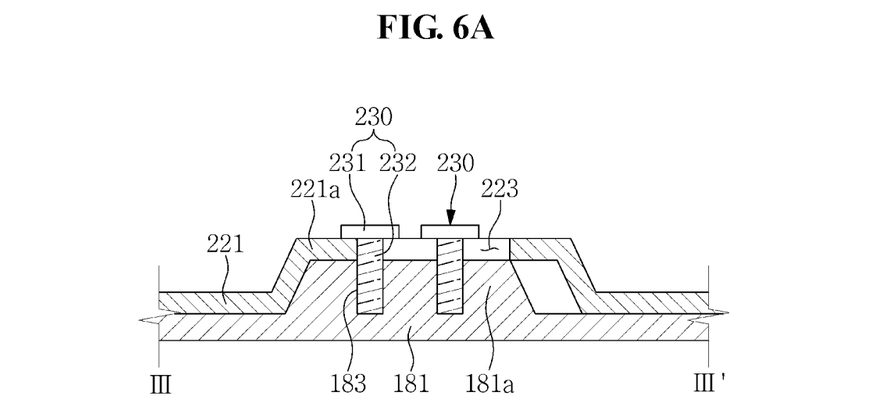
FIG. 6A is a cross-sectional view taken along line III-III' of FIG. 5A.
Figure 6B:
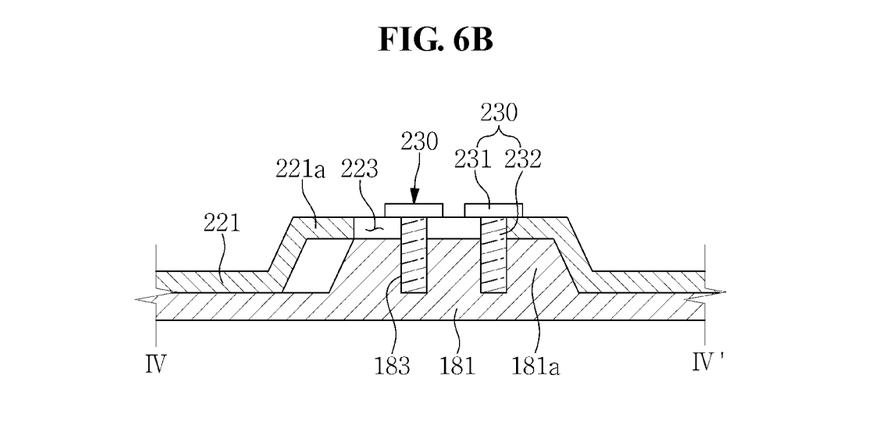
FIG. 6B is a cross-sectional view taken along line IV-IV' of FIG. 5B.

FIGS. 6A and 6B illustrate detailed configurations of the first auxiliary frame 210, the second auxiliary frame 220 and the coupling member 230 according to an exemplary embodiment.

FIG. 6A is a cross-sectional view taken along line III-III' of FIG. 5A, and FIG. 6B is a cross-sectional view taken along line IV-IV' of FIG. 5B;

Referring to FIGS. 6A and 6B, the coupling member 230 includes the head portion 231 and the screw portion 232.

The head portion 231 disposing the position adjusting portion 221 between the lower frame 180 and the head portion 231 fixes a position of the second auxiliary frame 220 relative to the lower frame 180. The head portion 231 has a width in the second direction D2 larger than a width in the second direction D2 of the aforementioned through hole 223 of the second auxiliary frame 220, such that movement of the head portion 231 into or through the through hole 223 is restricted.

The screw portion 232 extending through the through hole 223 and engaged with the lower frame 180 fastens a position of the second auxiliary frame 220 relative to the lower frame 180 such as in the first direction D1. In an exemplary embodiment, for example, the screw portion 232 includes screw threads and is engaged with the thread groove 183 of the lower frame 180 to be engaged therewith. Accordingly, the screw portion 232 fastens a position of the second auxiliary frame 220 disposed between the head portion 231 of the coupling member 230 and the lower frame 180.

Referring to FIGS. 5A to 6B, the second auxiliary frame 220 may be movable relative to the lower frame 180 in accordance with the size of the light guide plate 150 to be fixed to the lower frame 180 in varying positions. Since the light guide plate aligning portion 222 is extended from the position adjusting portion 221, both portions may be movable together relative to the lower frame 180. That is, as the through hole 223 of the second auxiliary frame 220 has a length in the first direction D1 longer than a diameter in the first direction D1 of the head portion 231 of the coupling member 230, the second auxiliary frame 220 may be movable along the first direction D1 in accordance with the size of the light guide plate 150. Accordingly, the second auxiliary frame 220 may move in accordance with the size of the light guide plate 150, and then be fastened to the lower frame 180.

The second auxiliary frame 220 may be provided in plural. The plurality of second auxiliary frames 220 may be disposed at the lower frame 180. In an exemplary embodiment, for example, as illustrated in FIG. 3, two second auxiliary frames 220 may be respectively disposed at corners of the light guide plate 150 to oppose each other in the second direction D2.

In an exemplary embodiment, for example, two position adjusting portions 221 are disposed to oppose each other, and two light guide plate aligning portions 222 are disposed to oppose each other, along the second direction D2. Accordingly, the two light guide plate aligning portions 222 may substantially prevent the light guide plate 150 from moving along the first direction D1 to fasten a position of the light opposing surface 150b of the light guide plate 150. When a position of the light opposing surface 150b of the light guide plate 150 is fastened by the light guide plate aligning portion 222, the light guide plate 150 may be brought into close contact with the light source unit 140 such that the distance between the light guide plate 150 and the light source unit 140 may be maintained substantially constant regardless of the size of the light guide plate 150. Accordingly, the optical characteristic deviations of the display device may be improved.

Each of the first auxiliary frame 210 and the second auxiliary frame 220 may have an L-like shape in the top plan view.

The first auxiliary frame 210 and the second auxiliary frame 220 may include polycarbonate ("PC") or a mixture of polycarbonate ("PC") and an acrylonitrile butadiene styrene copolymer ("ABS") resin.

Referring to FIGS. 5A to 6B, the lower frame 180 may further include a protrusion portion 181a, and the position adjusting portion 221 may further include a bent portion 221a. The protrusion portion 181a is disposed at an edge portion of the bottom portion 181 exposed by omission of the side portion 182. The protrusion portion 181a may be a separate element from the planar bottom portion 181 or may be formed as a unitary member with the bottom portion 181. The bent portion 221a is disposed spaced apart from the planar portion of the bottom portion 181 except for the protrusion portion 181a, to accommodate the protrusion portion 181a thereunder.

Due to the protrusion portion 181a of the lower frame 180 and the bent portion 221a of the position adjusting portion 221, a movable position of the second auxiliary frame 220 relative to the lower frame may be restricted to a range that enables coupling of the coupling member 230, thus facilitating the alignment between the through hole 223 and the thread groove 183. However, exemplary embodiments are not limited thereto, and the protrusion portion 181a of the lower frame 180 and the bent portion 221a of the position adjusting portion 221 may be omitted such that the lower frame 180 and the second auxiliary frame 220 may include only flat or planar portions.

Hereinafter, an alternative exemplary embodiment will be described in detail with reference to FIGS. 7A and 7B.

Figure 7A:
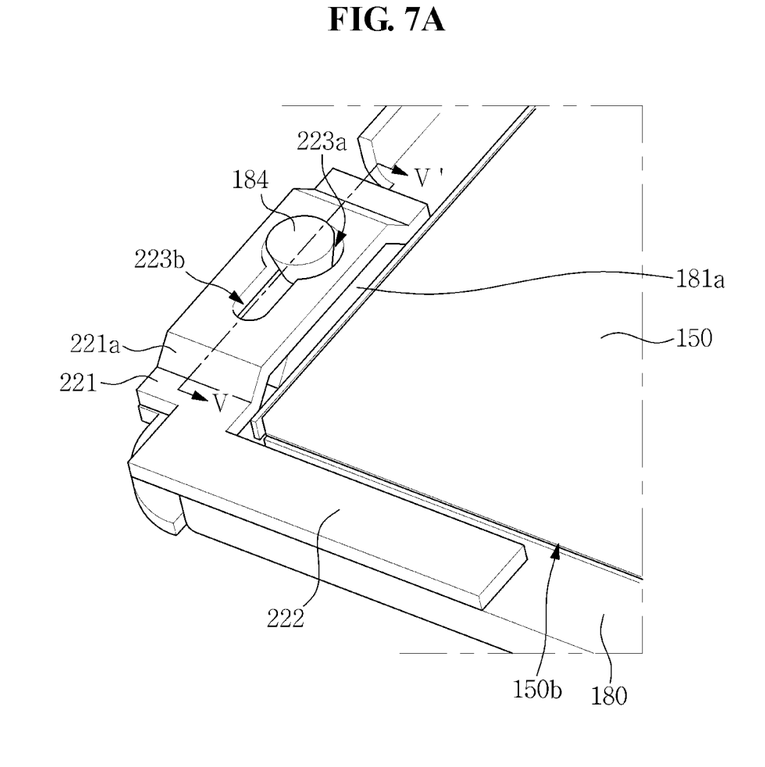
FIG. 7A is a perspective view schematically illustrating another exemplary embodiment of portion A of FIG. 3.
Figure 7B:
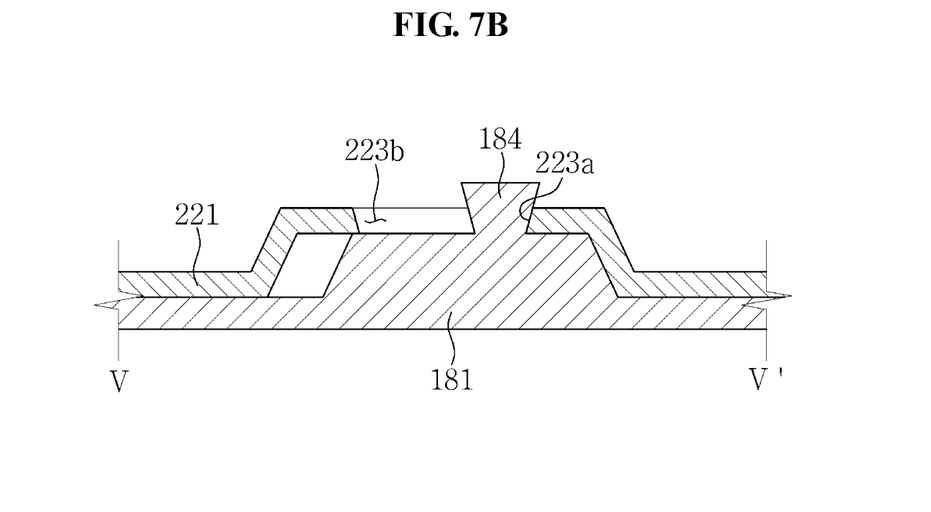
FIG. 7B is a cross-sectional view taken along line V-V' of FIG. 7A.

FIG. 7A is a perspective view schematically illustrating another exemplary embodiment of portion A of FIG. 3 according to the invention, and FIG. 7B is a cross-sectional view taken along line V-V' of FIG. 7A.

According to an alternative exemplary embodiment, a second auxiliary frame 220 has a through hole 223 including an insertion portion 223a and a fastening portion 223b.

The insertion portion 223a has a width in the second direction D2 different from a width in the second direction D2 of the fastening portion 223b. In an exemplary embodiment, for example, the insertion portion 223a may have a width in the second direction D2 larger than a width in the second direction D2 of the fastening portion 223b.

According to an alternative exemplary embodiment, a lower frame 180 includes a coupling member 184 protruding from a bottom portion 181. The coupling member 184 may protrude from the protrusion portion 181a of the lower frame 180 without being limited thereto. The coupling member 184 and the lower frame 180 may be unitary. As unitary, a portion of the bottom portion 181 may define the protrusion portion 181a and/or the coupling member 184.

According to an alternative exemplary embodiment, the coupling member 184 has a dovetail cross-section. In an exemplary embodiment, for example, an upper surface at a distal end of the coupling member 184 may have planar dimension and/or a planar area larger than a planar area of a lower surface of the coupling member 184. In the first and/or second directions, the upper surface of the coupling member 184 may have a diameter larger than a diameter of the lower surface of the coupling member 184.

According to an alternative exemplary embodiment, the coupling member 184 may be inserted through the through hole 223 at the insertion portion 223a of the through hole 223. When the coupling member 184 inserted into the through hole 223 is disposed at the fastening portion 223b which has a width in the second direction D2 less than a width in the second direction D2 of the insertion portion 223a, a position of the second auxiliary frame 220 may be fixed relative to the lower frame 180 by the coupling member 184.

In such an exemplary embodiment, a cross-section of the through hole 223 may have a shape corresponding to a shape of a cross-section of the coupling member 184. That is, the through hole 223 may have a trapezoidal cross-sectional shape of which a left side and a right side opposing each other in the first direction D1 correspond to a cross-sectional shape of the coupling member 184. Accordingly, the coupling force between the second auxiliary frame 220 and the lower frame 180 may be further improved.

Referring to FIGS. 7A and 7B, the lower frame 180 may include a protrusion portion 181a, and a position adjusting portion 221 may include a bent portion 221a. Due to the protrusion portion 181a of the lower frame 180 and the bent portion 221a of the position adjusting portion 221, a movable position of the second auxiliary frame 220 may be restricted to a range that enables coupling of the coupling member 184 thereto, thus facilitating the alignment between the through hole 223 and the coupling member 184. However, exemplary embodiments are not limited thereto. According to an alternative exemplary embodiment, the protrusion portion 181a of the lower frame 180 and the bent portion 221a of the position adjusting portion 221 may be omitted. Since the coupling member 184 may be more readily aligned by being engaged with the through hole 223, the lower frame 180 and the second auxiliary frame 220 may each be flat without the protrusion portion 181a of the lower frame 180 and the bent portion 221a of the position adjusting portion 221.

As set forth hereinabove, according to one or more exemplary embodiments, the display device may provide the following effects.

A distance between the light source and the light guide plate may be maintained constant, thereby improving the assembly tolerance of the light source and the light guide plate and improving optical characteristic deviations.

Further, optical characteristic deviations may be improved regardless of variations in manufacturing of the light guide plate.

While the invention has been illustrated and described with reference to the exemplary embodiments thereof, it will be apparent to those of ordinary skill in the art that various changes in form and detail may be formed thereto without departing from the spirit and scope of the invention.

What is claimed is:
1. A display device comprising:
   a display panel which displays an image with light provided thereto;
   a lower frame comprising a bottom portion facing the display panel and side portions each extending from the bottom portion;
   a light source unit which generates and emits the light, disposed on the bottom portion of the lower frame to extend along a first side portion thereof;
   a light guide plate through which the light is guided from the light source toward the display panel, the light guide plate comprising a light incident surface to which the light emitted from the light source unit is incident and a light opposing surface opposing the light incident surface in a first direction;
   a first auxiliary frame disposed in the lower frame, between the light incident surface of the light guide plate and the first side portion of the lower frame to restrict movement of the light incident surface in the first direction;
   a second auxiliary frame fixable to the bottom portion of the lower frame, the second auxiliary frame fixed to the bottom portion being movable along the first direction with respect to the bottom portion, to restrict movement of the light opposing surface in the first direction; and
   a coupling member with which the second auxiliary frame is fixed to the lower frame.
2. The display device of claim 1, wherein
   the second auxiliary frame includes a through hole defined therein through which the coupling member is extendable to the lower frame, and
   the coupling member comprises:
      a screw portion which extends through the through hole defined in the second auxiliary frame, and
      a head portion from which the screw portion protrudes,
   wherein a width of the head portion of the coupling member is larger than a width of the through hole through which the coupling member is extendable.
3. The display device of claim 2, wherein the screw portion of the coupling member is threaded.
4. The display device of claim 3, wherein the lower frame further comprises a threaded groove with which the screw portion of the coupling member is engagable.
5. The display device of claim 1, wherein the first auxiliary frame comprises:
   a first support portion extended along the first side portion of the lower frame and in contact with the light incident surface of the light guide plate; and
   a second support portion extended along and in contact with a second side portion of the lower frame which is extended from the first support portion in the first direction.
6. The display device of claim 5, wherein the first auxiliary frame has an L-like shape in a top plan view.
7. The display device of claim 1, wherein the second auxiliary frame comprises:
   a light guide plate aligning portion extended along the light opposing surface of the light guide plate and in contact with the light opposing surface of the light guide plate; and a position adjusting portion extended from the light guide plate aligning portion along the first direction, the position adjusting portion fixable to the bottom portion of the lower frame to adjust a position of the second auxiliary frame relative to the lower frame.

8. The display device of claim 7, wherein the second auxiliary frame has an L-like shape.

9. A display device comprising:
a display panel which displays an image with light provided thereto;
a lower frame comprising:
 a bottom portion facing the display panel,
 a coupling member protruding from the bottom portion, and
 side portions each extending from the bottom portion;
a light source unit which generates and emits the light, disposed on the bottom portion of the lower frame to extend along a first side portion thereof;
a light guide plate through which the light is guided from the light source toward the display panel, the light guide plate comprising a light incident surface to which the light emitted from the light source unit is incident and a light opposing surface opposing the light incident surface in a first direction;
a first auxiliary frame disposed in the lower frame, between the light incident surface of the light guide plate and the first side portion of the lower frame to restrict movement of the light incident surface in the first direction; and
a second auxiliary frame fixable to the bottom portion of the lower frame, the second auxiliary frame fixed to the bottom portion being movable along the first direction with respect to the coupling member protruding from the bottom portion, to restrict movement of the light opposing surface in the first direction,
wherein.

10. The display device of claim 9, wherein a protruded portion of the bottom portion of the lower frame defines the coupling member thereof.

11. The display device of claim 9, wherein the coupling member of the lower frame has a dovetail-shaped cross-section.

12. The display device of claim 9, wherein
the second auxiliary frame includes a through hole defined therein through which the coupling member is extendable, the through hole defined by an insertion portion and a fastening portion,
a width of the insertion portion of the through hole is different from a width of the fastening portion of the through hole, and a width of an upper surface of the coupling member of the lower frame is larger than the width of the fastening portion of the through hole.

13. The display device of claim 9, wherein the first auxiliary frame comprises:
a first support portion extended along the first side portion of the lower frame and in contact with the light incident surface of the light guide plate; and
a second support portion extended along and in contact with a second side portion of the lower frame which is extended from the first support portion in the first direction.

14. The display device of claim 13, wherein the first auxiliary frame has an L-like shape in a top plan view.

15. The display device of claim 9, wherein the second auxiliary frame comprises:
a light guide plate aligning portion extended along the light opposing surface of the light guide plate and in contact with the light opposing surface of the light guide plate; and
a position adjusting portion extended from the light guide plate aligning portion along the first direction, the position adjusting portion fixable to the bottom portion of the lower frame to adjust a position of the second auxiliary frame relative to the lower frame.

16. The display device of claim 15, wherein the second auxiliary frame has an L-like shape in a top plan view.

17. The display device of claim 1, wherein the coupling member is movable along the first direction, within the through hole of the second auxiliary frame.

18. The display device of claim 1, wherein
the first and second side portions of the lower frame extend from first and second edges of the bottom portion thereof, respectively,
a portion of the second edge is exposed from the second side portion, and
the second auxiliary frame is fixable to the exposed portion of the second edge.

19. The display device of claim 18, wherein
the bottom portion of the lower frame comprises a protruding portion at the exposed portion of the second edge, and
the second auxiliary frame is fixable to the protruding portion of the bottom portion, via the coupling member.

20. The display device of claim 12, wherein the width of the insertion portion of the through hole is larger than the width of the fastening portion of the through hole.

* * * * *